May 31, 1955   R. MAYER, JR   2,709,637
PHOTOGRAPHIC RECORDER
Filed July 15, 1949   2 Sheets-Sheet 2
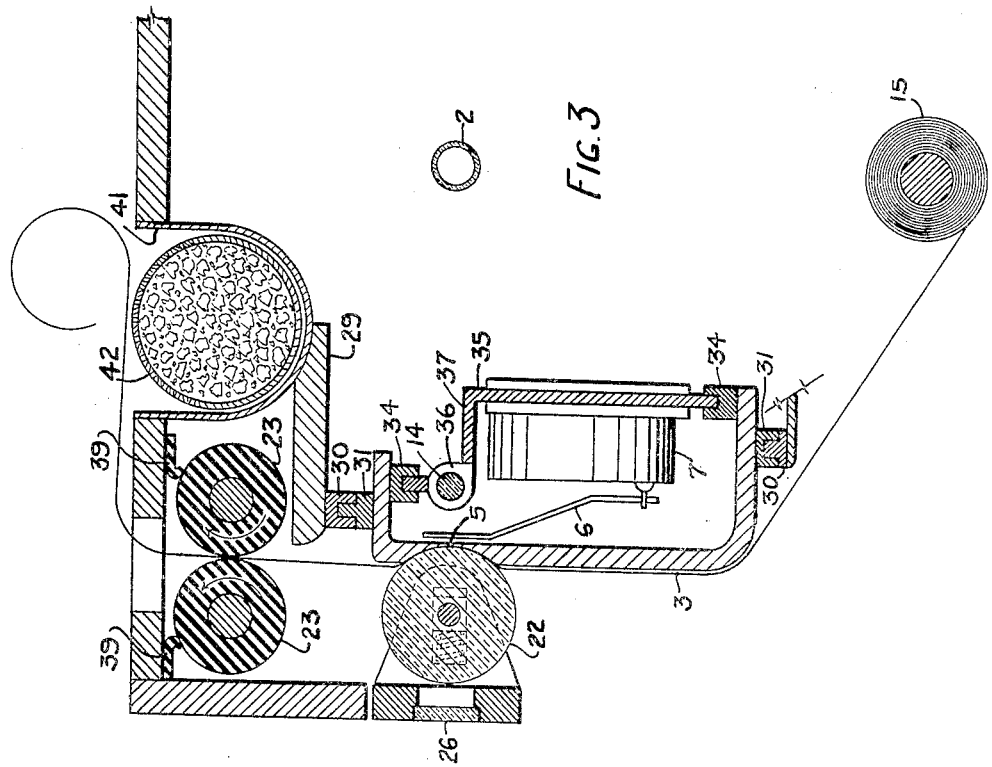
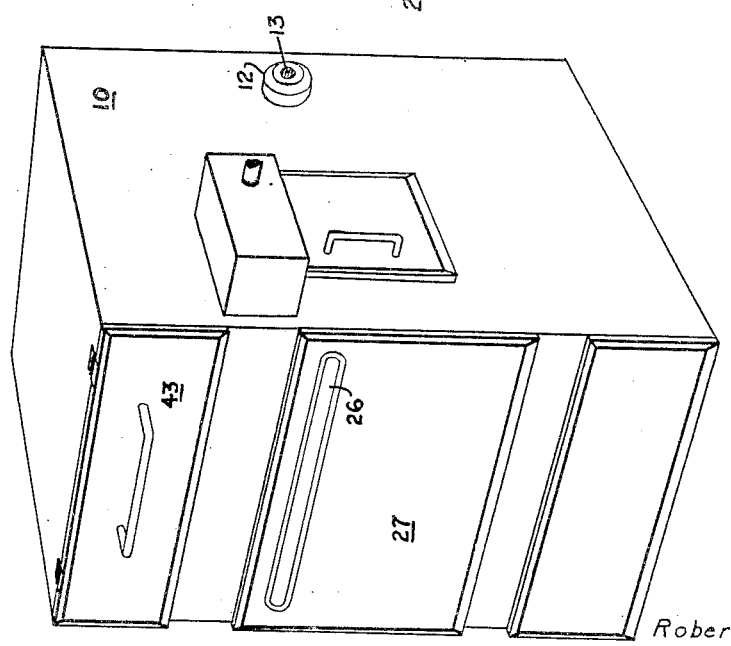
INVENTOR.
Robert Mayer, Jr.
BY
Wilmer Mechlin
HIS ATTORNEY.

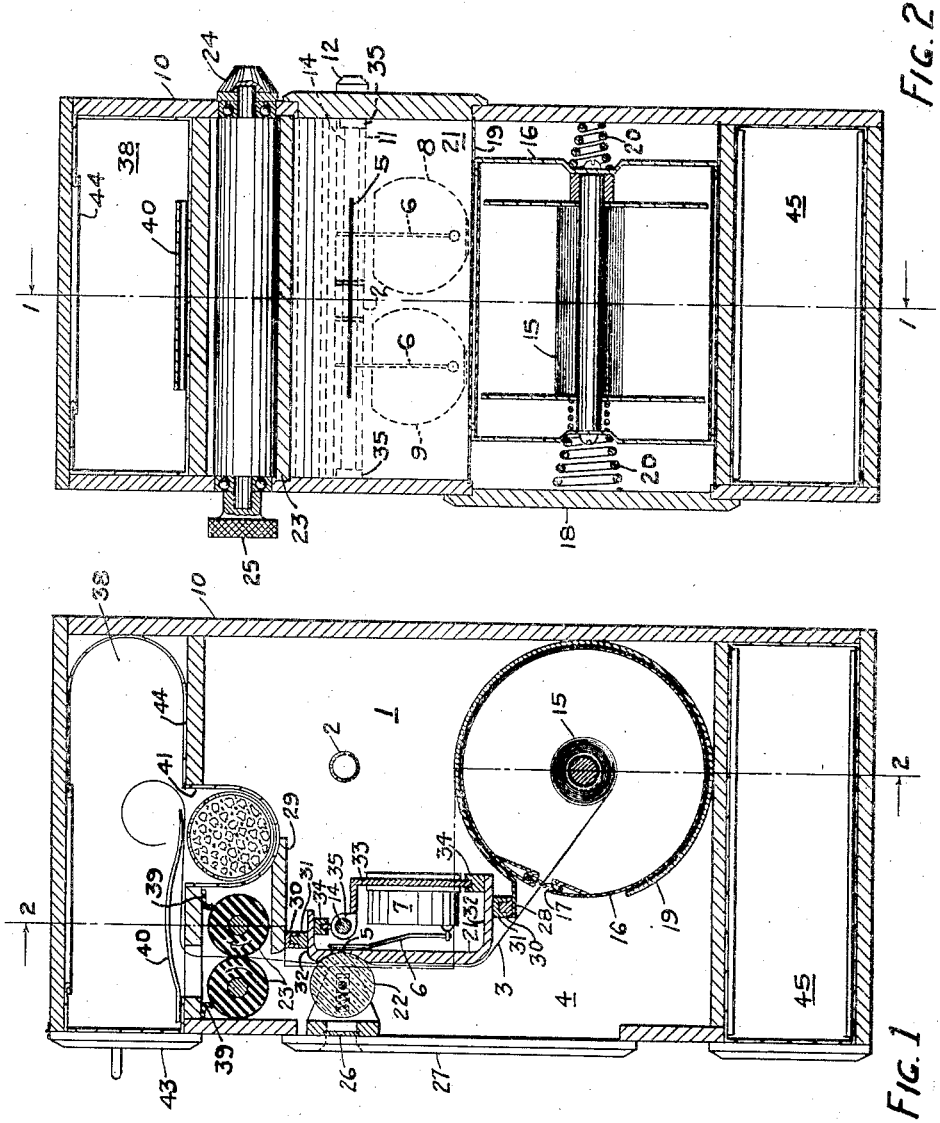
May 31, 1955  R. MAYER, JR  2,709,637
PHOTOGRAPHIC RECORDER
Filed July 15, 1949  2 Sheets-Sheet 1
INVENTOR.
Robert Mayer, Jr.
BY
HIS ATTORNEY.

United States Patent Office 2,709,637
Patented May 31, 1955

2,709,637

PHOTOGRAPHIC RECORDER

Robert Mayer, Jr., Dallas, Tex., assignor to Well Reconnaissance, Inc., Dallas, Tex., a corporation of Texas Application July 15, 1949, Serial No. 104,949

4 Claims. (Cl. 346—107)

This invention relates to photographic recorders for optically recording variable functions on sensitized paper.

The primary object of the invention is to provide an improved photographic recorder for recording variable functions by projecting the movements of a movable member responsive to such functions on sensitized paper.

Another object of the invention is to provide an improved photographic recorder wherein, by interposing a movable pointer between a light source and sensitized film, a record of the movement of the pointer is obtained.

An additional object of the invention is to provide a photographic recorder wherein, by utilizing a linear light source, and corresponding light collecting system and film exposure area, an accurate record of the movement of a movable member, interposed between the collecting system and the film, is obtained.

A further object of the invention is to provide a recording apparatus for both exposing and developing sensitized film, thereby making a permanent record without additional processing.

Yet another object of the invention is to provide a photographic recorder employing film sensitive only to artificial light, whereby the actions of the parts of the mechanism can be observed during operation.

A further object of the invention is to provide in a photographic recorder, improved mountings for certain of the parts of the mechanism, enabling these parts to be removed as sub-assemblies for inspection or other purposes.

Other objects and advantages of the invention will appear hereinafter in the detailed description, be particularly pointed out in the appended claims and illustrated in the accompanying drawings in which:

Figure 1 is a vertical sectional view, taken along the lines 1—1 of Figure 2, showing a preferred embodiment of the recorder of the present invention;

Figure 2 is a vertical sectional view, taken along the lines 2—2 of Figure 1;

Figure 3 is a vertical sectional view on an enlarged scale, taken along the same lines as Figure 1 with portions removed, to more clearly illustrate certain of the details of the construction; and Figure 4 is a perspective view showing the exterior of the recorder.

Referring now in detail to the drawings in which like reference characters designate like parts, there has been disclosed for illustrative purposes an embodiment of the improved photographic recorder of the present invention which is particularly adapted for recording varying resistances and self-potentials. A typical example of such an application, and one to which the lightweight self-contained unit illustrated particularly lends itself, is shallow-hole well-logging. In such an application, it is the usual practice to lower an electrode assembly of suitable type into the well to be logged and by transmitting electrical signals from the electro-magnetic field to the surface, there to record the variations in the signals and from them to determine the character of the formations or strata through which the assembly passes. Since of general usage, neither cable nor electrode assembly have been shown, and illustration has been limited to the recording apparatus per se. The latter, preferably positioned on the surface, is adapted to record such variations in the manner hereinafter to be described.

In making a photographic record of variable functions in accordance with the present invention, there is projected upon a sensitized medium, preferably in the form of a strip of film, a line or thin pencil of light which is interrupted adjacent or in the proximity of the film by a member whose movements correspond to the variations in the functions. By controlling the rate of feed of the film by one of the factors involved, such as depth of penetration or time, the shadow cast upon the film by the moving member will afford a permanent chart or plot of variations in function in terms of the control factor.

For the above purpose, the photographic recorder, in its illustrated embodiment, comprises a chamber 1 housing a light source 2 for projecting a beam of light upon and thus exposing a portion of a strip of film 3, the latter being housed in a film or exposure chamber 4 which is shielded from the light chamber except for an opening or passage 5 through which the light beam from the source is transmitted to the film. Adjacent or in close proximity to the film, on the light source side of the opening 5 and positioned to interrupt the light beam, is a movable member 6, the movements of which are to be recorded. For the recordation of electrical functions, as in the illustrated embodiment, the movable member 6 will usually be a swinging pointer or needle of an electrically responsive instrument 7. In the form shown, two such instruments are employed, one a voltmeter 8 and the other an ammeter 9, the meters being mounted in tandem below the path of the light beam with their pointers 6 extending or projecting above the meters and swinging across the opening 5 to intersect and partially interrupt the passage of light therethrough.

It will be evident that the meters 8 and 9 are electrically connected by suitable means to the aforementioned electrode assembly so that electrical impulses from the latter will cause corresponding movement in the pointers as the assembly is lowered into or moves within the well. As the matter to be determined by the apparatus is the nature of the strata passed by the assembly during its descent, the film feed will be geared to that of the assembly supporting cable so that the plot made will record the characteristics of the electrical impulses at any given depth.

In the preferred embodiment of the invention, the light and film chambers 1 and 4 are contained in a suitable case or housing 10 which may be compartmented into one or more additional compartments or chambers for purposes hereinafter to be set forth. Of the two main chambers, the light chamber 1 houses the light source 2 which is preferably capable of emitting a linear beam of light, a gaseous discharge tube or lamp being particularly suitable for this purpose. As shown, this lamp is disposed transversely of or normal to the path of travel of the film strip 3. To minimize diffusion of the beam, the lamp is relatively short, a ¾ inch arc in the preferred mercury type lamp having proved ample, and is positioned centrally of the light chamber. To facilitate inspection or replacement, the lamp may be suitably socketed in an elongated fixture 11 which extends across the chamber 1 and projects through a side of the case 10, its projection providing an exterior knob 12 having a central socket 13 for the reception of an electrical plug, not shown.

As previously mentioned, the light chamber 1 is connected to the film chamber 4 through a light-transmitting opening 5. Where, as here, the movement of the pointer or pointers 6 transversely of the direction of movement of the strip of film is to be recorded, this opening is in the form of a narrow slit or slot disposed transversely of the film and parallel to the lamp 2. This slit is of sufficient length to encompass or include the limits of movement of the light-interrupting portion of the pointer or pointers 6 and to further minimize passage of diffused light, is of minimum width, a width of 1/32 inch having been found satisfactory in practice.

On the inner or light side of the slit 5 are mounted the pointer or pointers, the latter swinging as close as practicable to the inner edge of the slot, if necessary by outwardly offsetting the light-interrupting portion of each pointer beyond its point of pivotal attachment to its meter. Intermediate the pointer and the light source is mounted a lens 14 for optically collecting and transmitting the light beam from the source. For this application, a cylindrical lens of glass, quartz or plastic is employed which collects and focuses the light emitted by the lamp 2 in a thin line or pencil of light, the lens being positioned to direct this beam through the slit 5. Capable of projecting a pencil beam of substantially uniform intensity throughout its length, the cylindrical lens 14, like the slit 5, if of sufficient length to encompass the movements of the pointer. With the slit 5, cylindrical lens 14 and lamp 2 all positioned parallel and in alignment and the light-interrupting portion of each pointer 6 swinging close to the entrance of the slit, the shadow of the pointer will be projected on the film at any given moment as substantially a point. The sharpness of definition of the shadow, already minimized by the narowness of the slit, the position of the latter relative to the pointer and the form of the light-emitting and transmitting media, is preferably further increased by painting or anodizing the inside walls of the light chamber to eliminate reflection.

In the other main portion of the case 10, the film chamber 4, is housed a feed roll 15 of strip film. It has been previously mentioned that the preferred form of light source 2 is a mercury vapor lamp, the light emitted by which is ultraviolet. This lamp is preferred to permit use in the recorder of diazotype film which is insensitive or impervious to daylight but is exposed by ultraviolet light. With such film, no protection from outside light is required and it is only necessary to shield the film chamber from the light source. While the diazotype film can thus be loaded into the recorder in an open spool, the roll shown is encased in a closed cartridge 16 of the so-called daylight type in which the film is drawn from the cartridge through a light-sealing opening 17 of rubber or other suitable material. The cartridge 16 is inserted into the recorder through a removable closure member 18 and within the film chamber is held or seated in a magazine 19, preferably cylindrical in contour. By positioning the magazine below the light chamber against the case and anchoring its ends in the sides of the case, in the manner shown, the upper wall of the magazine is utilized as part of the dividing wall between the two chambers. For holding the spool centrally of the recorder as well as restraining movement of the cartridge while the film is being unrolled, the case may be mounted between suitable resilient positioning means, such as the illustrated coil springs 20.

Outwardly of the magazine 19, the film is drawn over a backing or back-up plate 21, appropriately formed to provide a smooth non-marring bearing surface. Adjacent the slit 5, the film is engaged by a resiliently mounted pressure or bearing roller 22 by which the film is pressed tightly against the outer edges of the slit, thereby both presenting the film for exposure and sealing the slit against escape of light from the light source 2 into the film chamber. In the preferred embodiment of the invention, the outer face of the back-up plate 21 on either side of the slit 5 is arcuately or cylindrically concave to both conform to the periphery of the pressure roller and minimize the thickness of the slit. Beyond the slit 5, the film passes between a pair of drive rollers 23 of rubber or other suitable material which provide the force by which the film is fed or driven through the apparatus. As previously mentioned, the film for well-testing, is fed through the apparatus at a rate correlated with that at which the cable carrying the electrode assembly is unreeled. Such correlation is obtained by connecting the drive rolls to a cable reel, not shown, through suitable gearing 24. The illustrated drive rollers are also adapted to be driven by hand when desired, through the provision of a hand wheel 25.

When the film employed is the preferred diazotype paper, the pressure roller 22 may be made of glass or transparent plastic and the front of the case 10 in alignment with the roller is provided with a transparent eye piece or viewer 26, enabling the progress of the film to be observed at any time during operation of the apparatus. For assembly purposes, the viewer 26 may be formed as part of a removable cover plate 27 on which the pressure roller may be suitably resiliently journaled.

It has been previously mentioned that the exposure slit 5 may be formed in the back-up plate 21. In the preferred form of the invention, this back-up plate also serves as a removable mounting or support for both the cylindrical lens 14 and the meters 8 and 9. For this purpose, the plate is carried between an outstanding upper lip or flange 28 formed as part of the magazine 19 and a cross member 29 on the upper face of the exposure slit, and connected thereto through guide members or rails 30. These members are designed to slidably engage and interfit with ribs 31 of corresponding configuration carried by the back-up plate 21. To prevent interference with the operating parts of the device, the back-up plate is of substantially U-shape in section and the ribs 31 are mounted on the outer faces of its spaced legs 32. Since required not only to mount the back-up plate and its associated assembly, but to seal the film chamber against entrance of light, the connections between the guide members 30 and ribs 31 extend fully across the inside of the case 10 and are of tongue and groove or equivalent construction. With this connection, it is possible to withdraw the back-up plate, the meters and the lens as a sub-assembly or unit through a suitable opening in the side of the case. This unit may also be divided into a further sub-assembly by mounting the meters and lens on a cross bracket 33 mounted between and slidably connected to the legs 32 of the back-up plate 21, through tongue and groove connections 34. However, unlike the mounting of the back-up plate proper, it is unnecessary that that of the bracket be light-proof. The bracket shown is of inverted L-shape with the meters carried on one arm 35 and the cylindrical lens 14 mounted between suitable transversely spaced lugs 36 on the other arm 37.

An important feature of the apparatus of the present invention is its ability not only to record but to develop the film immediately after the record is made, thereby eliminating further processing. To this end, the film on being fed through the drive rollers 23 passes into a developing chamber 38, the latter being shielded from the film chamber by the use of flaps or similar sealing means 39, of rubber or other suitable material, which extend across and engage the peripheries of the drive rollers. On entering the developing chamber, the film is deflected downwardly by a guide bar 40 and caused to pass over a well 41 formed in the lower wall of the developing chamber and containing the developing medium. For the aforementioned diazotype film this medium may be ammonia vapor, the ammonia being introduced into the apparatus as lumped ammonium carbonate in a container 42 having a perforated upper wall. By positioning the well 41 above and relatively close to the lamp 2, the heat given off by the latter is employed to heat the ammonium carbonate, causing it to give off the desired ammonia fumes and developing the film as it passes over the container 42. The guide bar 40 in the illustrated embodiment serves both to guide the film and to provide a shearing or tearing edge by which the exposed and developed portion of the film, temporarily stored in the developing compartment, can be torn or severed from the roll whenever desired, usually after an operation has been completed. To facilitate removal of the film, as well as introduction of the container of developing medium, the developing chamber is closed by a hinged door 43 and provided with a separable or removable lining 44 to which the guide bar is attached.

It will be seen that in the illustrated embodiment, there is a separate compartment 45 in the base of the recorder. This compartment is not necessary for operation of the device but here provides storage space for extra parts or other purposes.

The advantage of the recording apparatus of the present invention in simplicity and ready accessibility of parts and ability to provide a permanent film record without further processing, while increased when diazotype film is employed is also inherent when using ordinary film. In the latter case, the film chamber will be sealed against outside light, to which the film is sensitive, and a suitable developing medium will be employed. In result, the difference will be that with an ordinary photographic emulsion the shadow cast upon the film by the pointer 6 will leave that portion of the film unexposed and after the paper is developed, will appear as a white line on a black background. With diazotype paper, the shadow will be the only unbleached portion of the film and when developed the recording will be a dark line on a white background.

Due to the selection and arrangement of its several parts, the optical system here employed is considerably more efficient in utilizing the intensity of the light source than is any string or mirror galvanometer system and in ruggedness the present system is far greater. Over pen and ink recorders, which have found wide usage for recording purposes, the present apparatus has the advantage, among others, of having no prior inertia to overcome in swinging the meter pointer, thus eliminating the necessity for amplification of the electrical signals received by the responsive instrument or instruments. While illustrated with an instrument responsive to electrical signals, it will be evident that the apparatus may as well be adapted for recording mechanical functions either by substituting a mechanical responsive instrument or by utilizing an electrical instrument after first converting the variable functions into corresponding electrical signals.

From the above detailed description it will be apparent that there has been provided an improved photographic recorder having a minimum of parts of rugged construction, which is capable of making a true, clear record of any variable functions to be recorded, of employing daylight-safe film and of furnishing a permanent record without further processing. It will be understood that the described and disclosed embodiment is merely exemplary of the invention and that all modifications are intended to be included which do not depart either from the spirit of the invention or the scope of the appended claims.

Having described my invention I claim:

1. A photographic recorder comprising a case partitioned into separate light and film chambers, a light source in said light chamber, and means releasably secured to said case and removable as a unit therefrom, said means including as elements a member separating said chambers and having an exposure opening therein for connecting said chambers, lens means in said light chamber for focusing a beam of light from said light source through said opening, and a movable member interposed between said lens means and said opening.

2. A photographic recorder comprising a case partitioned into separate light and film chambers, a light source in said light chamber, and means slidably connected to said case and removable as a unit therefrom, said means including as elements a member separating said chamber and having an exposure opening therein for connecting said chambers, lens means in said light chamber for focusing a beam of light from said source through said opening, and a movable member interposed between said lens means and said opening.

3. A photographic recorder comprising a case divided by a partition into separate light and film chambers, a back-up plate forming part of said partition and having a slot connecting said chambers, said back-up plate being slidably and light-sealingly connected to adjoining parts of said partition, an optical system for focusing a beam of said light through said slot, a movable member interposed between said optical system and said slot for casting a shadow through said slot, and means mounting said optical system and movable member and removably secured to said back-up plate, whereby said mounting means, optical system and movable member may be detached as a unit from said back-up plate and removed as a unit with said back-up plate from said casing.

4. A photographic recorder comprising a case compartmented into separate light and film chambers, a partitioning member interposed between said chambers, a slit in said member connecting said chambers, an opaque movable member in said light chamber, a light source in said light chamber emitting ultraviolet light, an optical system interposed between said movable member and said light source for projecting a shadow of said movable member through said slit, means in said film chamber for feeding a strip of diazotype film past said slit, a transparent roller resiliently mounted in said film chamber for pressing said film against said slit and sealing said film chamber from light from said source, and an opening in said case for viewing said film through said transparent roller.

References Cited in the file of this patent

UNITED STATES PATENTS

| | | |
|---|---|---|
| 1,056,878 | Aspinwall et al. | Mar. 25, 1913 |
| 1,073,832 | Wlodzimirski | Sept. 23, 1913 |
| 1,204,558 | Friedman | Nov. 14, 1916 |
| 1,506,764 | May | Sept. 2, 1924 |
| 2,300,803 | Pattee | Nov. 3, 1942 |
| 2,308,130 | Von Meister et al. | Jan. 13, 1943 |
| 2,348,401 | Manzanero | May 9, 1944 |
| 2,458,877 | Rose | Jan. 11, 1949 |
| 2,521,667 | Neyhart | Sept. 5, 1950 |
| 2,659,653 | Owens | Nov. 17, 1953 |
| 2,660,509 | Rusch | Nov. 24, 1953 |